United States Patent
Cashman et al.

(10) Patent No.: US 10,444,995 B2
(45) Date of Patent: *Oct. 15, 2019

(54) AUTOMATED SELECTION OF FUNCTIONS TO REDUCE STORAGE CAPACITY BASED ON PERFORMANCE REQUIREMENTS

(71) Applicant: International Business Machines Corporation, Armonk, NY (US)

(72) Inventors: Paul N. Cashman, Winchester (GB); Barry D. Whyte, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 150 days.

This patent is subject to a terminal disclaimer.

(21) Appl. No.: 14/571,179

(22) Filed: Dec. 15, 2014

(65) Prior Publication Data

US 2015/0100750 A1  Apr. 9, 2015

Related U.S. Application Data

(63) Continuation of application No. 13/469,002, filed on May 10, 2012, now Pat. No. 8,959,124, which is a continuation of application No. 13/247,283, filed on Sep. 28, 2011, now Pat. No. 8,965,937.

(51) Int. Cl.
*G06F 3/06* (2006.01)

(52) U.S. Cl.
CPC ............ *G06F 3/0608* (2013.01); *G06F 3/061* (2013.01); *G06F 3/067* (2013.01); *G06F 3/0641* (2013.01); *G06F 3/0665* (2013.01); *G06F 3/0685* (2013.01)

(58) Field of Classification Search
CPC .. G06F 3/067; G06F 3/0631; G06F 17/30156; G06F 17/30082; G06F 17/302; G06F 3/0641; G06F 3/0604; H04L 67/1097; H04L 67/1002; H04L 67/2842

See application file for complete search history.

(56) References Cited

U.S. PATENT DOCUMENTS

| | | |
|---|---|---|
| 7,065,619 B1 | 6/2006 | Zhu et al. |
| 7,536,529 B1 | 5/2009 | Chatterjee et al. |
| 8,112,605 B2 | 2/2012 | Kavuri |

(Continued)

FOREIGN PATENT DOCUMENTS

| | | |
|---|---|---|
| CN | 102104496 A | 6/2011 |
| WO | 2010097960 | 9/2010 |
| WO | 2010004856 A1 | 10/2010 |

OTHER PUBLICATIONS

English Abstract for CN102104496A, published on Jun. 22, 2011, 9 pages.

(Continued)

*Primary Examiner* — David T. Brooks
*Assistant Examiner* — Berhanu Mitiku
(74) *Attorney, Agent, or Firm* — Nathan M. Rau

(57) ABSTRACT

A plurality of functions to configure a unit of a storage volume is maintained, wherein each of the plurality of functions, in response to being applied to the unit of the storage volume, configures the unit of the storage volume differently. Statistics are computed on growth rate of data and access characteristics of the data stored in the unit of the storage volume. A determination is made as to which of the plurality of functions to apply to the unit of the storage volume, based on the computed statistics.

12 Claims, 9 Drawing Sheets

(56) References Cited

U.S. PATENT DOCUMENTS

| | | | |
|---|---|---|---|
| 8,156,306 B1* | 4/2012 | Raizen | G06F 3/0608 707/813 |
| 9,274,941 B1* | 3/2016 | Throop | G06F 12/023 |
| 2004/0162958 A1 | 8/2004 | Kano et al. | |
| 2006/0161642 A1* | 7/2006 | Bopardikar | G06F 3/061 709/219 |
| 2007/0050684 A1* | 3/2007 | Takaoka | G06F 3/061 714/47.2 |
| 2008/0059704 A1 | 3/2008 | Kavuri | |
| 2008/0282047 A1 | 11/2008 | Arakawa et al. | |
| 2009/0132619 A1* | 5/2009 | Arakawa | G06F 3/0605 |
| 2009/0240809 A1* | 9/2009 | La Frese | G06F 9/505 709/226 |
| 2010/0191906 A1 | 7/2010 | Beniyama et al. | |
| 2010/0299489 A1* | 11/2010 | Balachandriah | G06F 11/3442 711/162 |
| 2011/0066803 A1 | 3/2011 | Arakawa et al. | |
| 2012/0005449 A1 | 1/2012 | Reed et al. | |
| 2012/0110260 A1 | 5/2012 | Chavda et al. | |
| 2013/0080408 A1 | 3/2013 | Cashman et al. | |
| 2013/0080728 A1 | 3/2013 | Cashman et al. | |

OTHER PUBLICATIONS

International Search Report & Written Opinion, dated Jan. 24, 2013, for International Application No. PCT/IB2012/054963, 8 pages.
Arora et al., "Opportunities Concerns, and Challenges in the Adoption of Cloud Storage", dated 2012, International Journal of Computer Science and Information Technologies, vol. 3 (3), Total 6 pages.
Burr et al., "Hitachi Dynamic Provisioning Software", Application Brief, Hitachi Data Systems, Sep. 2009, 20 pgs.
M. Dutch "Understanding Data Depuplication Ratios" dated Jun. 2008, Data Management Forum, Total 13 pages.
"Automated Storage Tiering on Infortrend's ESVA Storage Systems", Infortrend Technology Inc., 2011, 16 pgs.
Mell et al., "The NIST Definition of Cloud Computing (Draft)", National Institute of Standards and Technology U.S. Department of Commerce, Jan. 2011, 7 pgs.
Preliminary Amendment dated Oct. 12, 2011, for U.S. Appl. No. 13/247,283 (37.269), filed Sep. 28, 2011 by inventors Paul N. Cashman et al., Total 12 pages.
Office Action, dated Jul. 23, 2012, for U.S. Appl. No. 13/247,283 (37.269), filed Sep. 28, 2011, invented by Paul N. Cashman et al., Total 31 pages.
Response to Office Action, dated Oct. 23, 2012, for U.S. Appl. No. 13/247,283 (37.269), filed Sep. 28, 2011 by inventors Paul N. Cashman et al., Total 12 pages.
Office Action, dated Feb. 1, 2013, for U.S. Appl. No. 13/247,283 (37.269), filed Sep. 28, 2011 by inventors Paul N. Cashman et al., Total 22 pages.
Response to Office Action, dated May 1, 2013, for U.S. Appl. No. 13/247,283 (37.269), filed Sep. 28, 2011 by inventors Paul N. Cashman et al., Total 11 pages.
Preliminary Amendment, dated May 10, 2012, for U.S. Appl. No. 13/469,002 (37.269C1), filed May 10, 2012, invented by Paul N. Cashman et al., Total 16 pages.
Final Office Action, dated Aug. 15, 2013, for U.S. Appl. No. 13/247,283 (37.269), filed Sep. 28, 2011 by inventors Paul N. Cashman et al., Total 24 pages.
Response to Final Office Action, dated Nov. 15, 2013, for U.S. Appl. No. 13/247,283 (37.269), filed Sep. 28, 2011 by inventors Paul N. Cashman et al., Total 11 pages.
Notice of Allowance, dated Sep. 17, 2014, for U.S. Appl. No. 13/247,283 (37.269), filed Sep. 28, 2011, invented by Paul N. Cashman et al., Total 17 pages.
Office Action, dated Jul. 16, 2012, for U.S. Appl. No. 13/469,002 (37.269C1), filed May 10, 2012, invented by Paul N. Cashman et al., Total 17 pages.
Response to Office Action, dated Oct. 16, 2012, for U.S. Appl. No. 13/469,002, filed May 10, 2012, invented by Paul N. Cashman et al., Total 8 pages.
Office Action, dated Feb. 1, 2013, for U.S. Appl. No. 13/469,002 (37.269C1), filed May 10, 2012, invented by Paul N. Cashman et al., Total 17 pages.
Response to Office Action, dated May 1, 2013, for U.S. Appl. No. 13/469,002 (37.26901), filed May 10, 2012, invented by Paul N. Cashman et al., Total 8 pages.
Final Office Action, dated Aug. 15, 2013, for U.S. Appl. No. 13/469,002 (37.269C1), filed May 10, 2012, invented by Paul N. Cashman et al., Total 23 pages.
Response to Final Office Action, dated Nov. 15, 2013, for U.S. Appl. No. 13/469,002 (37.26901), filed May 10, 2012, invented by Paul N. Cashman et al., Total 8 pages.
Notice of Allowance, dated Sep. 17, 2014, for U.S. Appl. No. 13/469,002 (37.269C1), filed May 10, 2012, invented by Paul N. Cashman et al., Total 16 pages.
International Search Report & Written Opinion, dated Jan. 24, 2013, for International Application No. PCT/IB2012/054963, Total 8 pp.
English Abstract for CN102104496A, published on Jun. 22, 2011, Total 9 pp.
Makatos et al., "ZBD: Using Transparent Compression at the Block Level to Increase Storage Space Efficiency," 2010 International Workshop on Storage Network Architecture and Parallel I/Os, IEEE 2010, 10 pages DOI: 10.1109/SNAPI.2010.15.
Tsuchiya et al., "DBLK: Deduplication for Primary Block Storage," Mass Storage Systems and Technologies (MSST), IEEE 2010, 6 pages DOI: 10.1109/MSST.2011.5937237.
Qian et al., "ThinStore: Out-of-Band Virtualization with Thin Provisioning," 2011 Sixth IEEE International Conference on Networking, Architecture, and Storage, IEEE 2011, 10 pages DOI: 10.1109/NAS.2011.39.

* cited by examiner

AUTOMATED SELECTION OF FUNCTIONS TO REDUCE STORAGE CAPACITY BASED ON PERFORMANCE REQUIREMENTS

CROSS-REFERENCE TO RELATED APPLICATION

This application is a continuation of U.S. patent application Ser. No. 13/469,002, filed May 10, 2012, wherein U.S. patent application Ser. No. 13/469,002 is a continuation of U.S. patent application Ser. No. 13/247,283 filed Sep. 28, 2011, wherein U.S. patent application Ser. Nos. 13/469,002 and 13/247,283 are incorporated herein by reference in their entirety.

BACKGROUND

1. Field

The disclosure relates to a method, system, and computer program product for the automated selection of functions to reduce storage capacity based on performance requirements.

2. Background

Many features that are deployed in storage systems aim to reduce business costs. For example, data reduction or free space reclamation may be used to reduce the need for storage capacity. In certain situations, such features may be deployed via thin provisioning in which free space is reclaimed, via deduplication in which multiple references may be maintained to a single data stream, or via data compression in which data is reduced by applying either lossy or lossless compression mechanisms.

In thin provisioning a storage volume may be defined but storage space may be allocated for the storage volume only when write operations are performed to the storage volume. In data duplication only a single copy of a set of duplicate data may be maintained and pointers may be maintained such that the locations at which the original duplicate data was stored can be determined In data compression lossy compression may cause a greater reduction in storage requirements in comparison to lossless compression. It may be noted that storage space requirements may be reduced via thin provisioning, via data duplication, and via data compression. In contrast to thin provisioning, data duplication, or data compression that reduce storage space requirements, a fully allocated volume may not have any thin provisioning, data duplication, or data compression, and may not reduce storage space requirements.

SUMMARY OF THE PREFERRED EMBODIMENTS

Provided are a method, a system, and a computer program product, wherein a plurality of functions to configure a unit of a storage volume is maintained, wherein each of the plurality of functions, in response to being applied to the unit of the storage volume, configures the unit of the storage volume differently. Statistics are computed on growth rate of data and access characteristics of the data stored in the unit of the storage volume. A determination is made as to which of the plurality of functions to apply to the unit of the storage volume, based on the computed statistics.

In certain embodiments, the plurality of functions include thin provisioning, wherein the computed statistics include determining a rate at which write operations are performed on the unit of the storage volume and an available amount of unused space on the unit of the storage volume. Thin provisioning is applied to the unit of the storage volume, in response to determining that the rate at which write operations are performed on the unit of the storage volume does not exceed a predetermined rate of write operations and the available amount of unused space on the unit of the storage volume exceeds a predetermined threshold.

In certain additional embodiments, the plurality of functions includes data deduplication, wherein the computed statistics include determining how much duplicative data is present on the unit of the storage volume. Data deduplication is applied to the unit of the storage volume, in response to determining that duplicative data present on the unit of the storage volume exceeds a predetermined threshold and the access time requirement for the unit of the storage volume is greater than a predetermined access time rate.

In further embodiments, the plurality of functions includes full allocation. Full allocation is applied to the unit of the storage volume, in response to determining that access time requirement for the unit of the storage volume is less than a predetermined threshold amount of time.

In yet further embodiments, the plurality of functions include data compression, wherein the computed statistics include determining how much the data stored on the unit of the storage volume is capable of being compressed. The data stored on the unit of the storage volume is compressed, in response to determining that access time requirement for the data will be met subsequent to the compressing of the data stored in the unit of the storage volume.

In additional embodiments, the plurality of functions includes full allocation, thin provisioning, data compression, and data deduplication in a decreasing order of performance in terms of performing operations on the unit of the storage volume, and in an increasing order of efficiency in terms of storage requirements in the unit of the storage volume.

In yet additional embodiments, the unit of the storage volume is an extent that comprises a predetermined number of kilobytes.

In further embodiments, a selected unit of a selected storage volume is upgraded or downgraded in terms of access time or storage efficiency by applying a different function to data stored in the selected unit of the selected storage volume.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Application of Features to Reduce Storage Capacity Needs

Various systems may provide one of more types of features for reduction of storage capacity needs, but it may be up to the user to decide which of the features are applicable to the particular data volumes they intend to provision. Additionally, the features to apply may be decided at the time of provisioning a volume, and to change the application of one feature to another may need user intervention and some detailed analysis of the benefits that each feature may or may not provide.

Certain embodiments allow a dynamic analysis of the behavior of a given volume and an automatic determination as to which of the available features best suits the data creation and subsequent access characteristics of the given volume. Certain embodiments allow the migration of a volume to provide the best feature based on the dynamic analysis of the creation and access characteristics. Such embodiments allow an automated determination as to which features are best suited to be applied to the data stored on a storage volume. As a result, end users do not have to manually determine whether a given feature is applicable for a selected volume.

In certain embodiments statistics are maintained (on a per volume basis) on data growth rates and access characteristics for the data. The maintained statistics allow the system to determine which function to use on the data based on some predefined templates that define usage characteristics of each function (e.g., thin provisioning, deduplication, compression, etc.).

In certain embodiments, a determination is made as to whether a storage volume can be "down featured" or downgraded. Down featured means changing the function that is applied to a storage volume such that there is a reduction is access speed but an increase in storage capacity. For example, a new volume may always be provisioned as a fully allocated volume that does not use thin provisioning, deduplication, compression, etc. The system runs for a period of time and accumulates some statistics that provide the growth and access patterns. The system can then decide that if on the continuum of features, the data on this volume is well suited to compression, and if the compression throughput rates can meet the access characteristics, then the volume can be "down featured" from fully allocated to compressed.

Exemplary Embodiments

Figure 1:
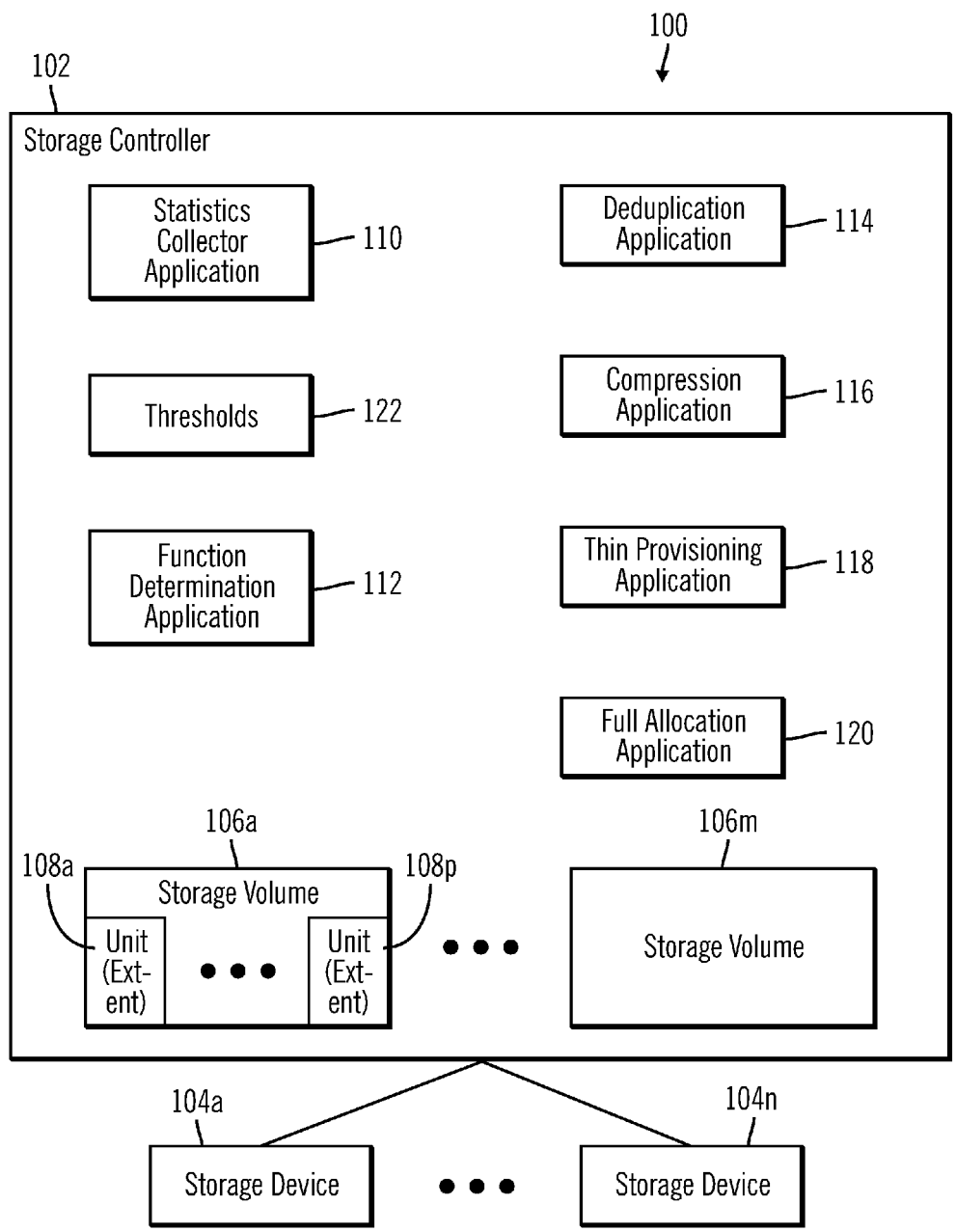
FIG. 1 illustrates a block diagram of a computing environment that includes a storage controller coupled to a plurality of storage devices, in accordance with certain embodiments.

FIG. 1 illustrates a block diagram of a computing environment 100 that includes a storage controller 102 coupled to a plurality of storage devices 104a . . . 104n, in accordance with certain embodiments. In certain embodiments the computing environment 100 may be part of a cloud computing environment. The storage controller 102 may comprise any suitable computational device including those presently known in the art, such as, a personal computer, a workstation, a server, a mainframe, a hand held computer, a palm top computer, a telephony device, a network appliance, a blade computer, a server, etc. The plurality of storage devices 104a . . . 104n may include any suitable storage devices, such as, hard disks, solid state disks, optical disks, tapes, etc.

The storage controller 102 controls the plurality of storage devices 104a . . . 104n and creates a plurality storage volumes 106a . . . 106m that logically represent data stored in the plurality of storage devices 104a . . . 104n. Each storage volume may be comprised of a plurality of units, such as extents, blocks, etc. For example, in FIG. 1 storage volume 106a is shown as being comprised of a plurality of extents 108a . . . 108p.

The storage controller 102 includes a statistics generator application 110, a function determination application 112, a deduplication application 114, a compression application 116, a thin provisioning application 118, and a full allocation application 120. The storage controller 102 also maintains a plurality of predetermined thresholds 122 and other information related to the performance and characteristics of the deduplication application 114, the compression application 116, the thin provisioning application 118, and the full allocation application 120.

The statistics collector application 110 generates statistics comprising metadata related to the data stored in the plurality of storage volumes 106a . . . 106m. The function determination application 112 uses the statistics generated by the statistics collector application 110 and based on computations made by using the thresholds 122 determines which of the deduplication application 114, the compression application 116, the thin provisioning application 118, or the full allocation application 120 to apply to data stored in units of the storage volumes 106a . . . 106m.

Figure 2:
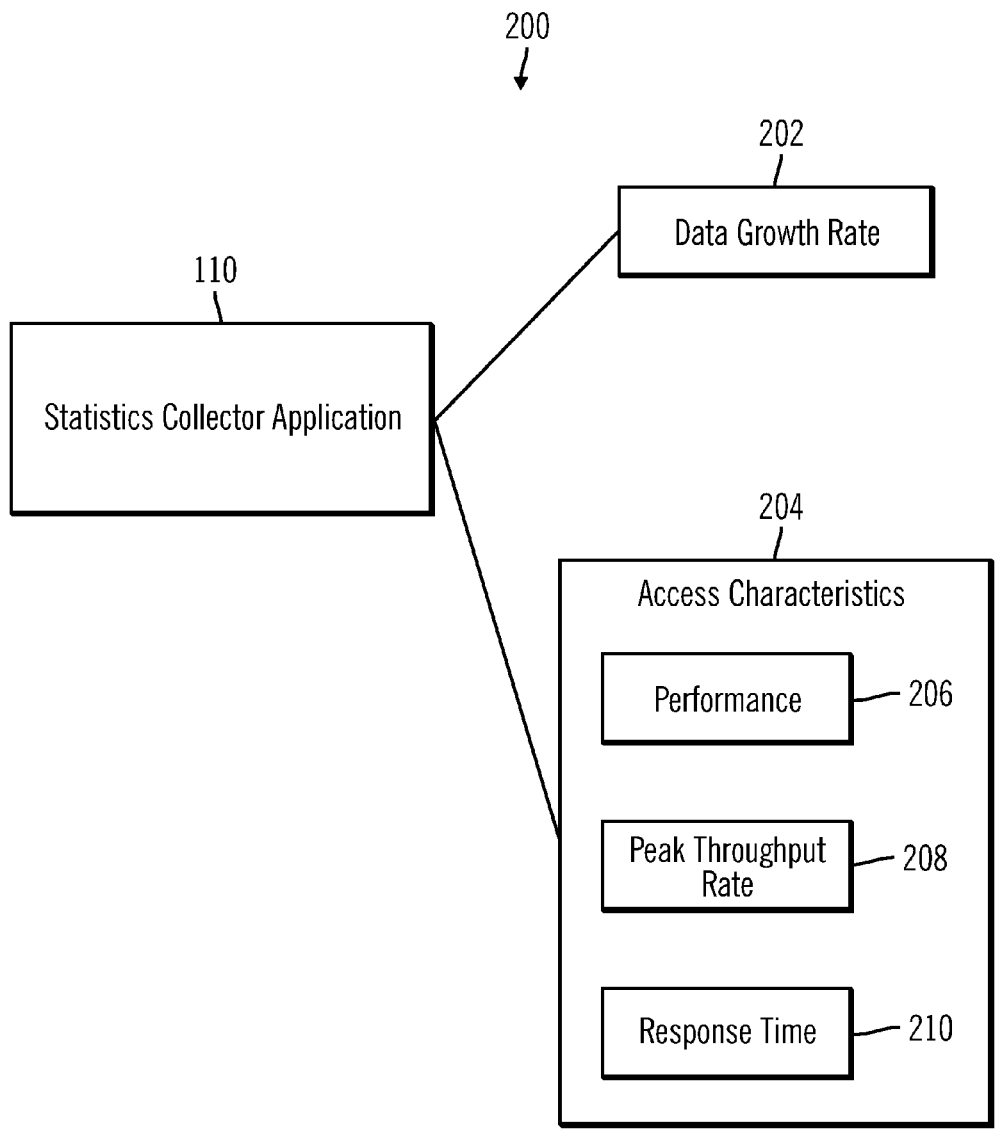
FIG. 2 illustrates a block diagram that shows how a statistics collector application implemented in the storage controller collects statistics on data stored in units of storage volumes corresponding to the plurality of storage devices, in accordance with certain embodiments.

FIG. 2 illustrates a block diagram 200 that shows how the statistics collector application 110 implemented in the storage controller 102 collects statistics on data stored in units of storage volumes 106a . . . 106m corresponding to the plurality of storage devices 104a . . . 104n, in accordance with certain embodiments.

In certain embodiments the statistics collector application 110 generates statistics, per storage volume or per unit (e.g., extent). The collected statistics may also be referred to as metadata. The collected statistics may relate to data growth rate 202 and access characteristics 204. Other statistics may also be generated.

Data growth rate 202 may be a measure of how fast the used capacity on a storage volume or unit is growing. For example, the data growth rate of a selected unit may be estimated to be 2 kilobytes per day based on historical data growth patterns in the selected unit, wherein the data growth may be caused at least by write operations.

Access characteristics 204 may include a measure of the speed of data access for input/output (I/O) operations such as read, write, append, etc. The performance 206, peak throughput rates (in megabytes per second, Input Output operations per second, etc.) 208, response time 210, etc., may be measured. In certain embodiments, the access characteristics may also determine the locality of access.

Figure 3:
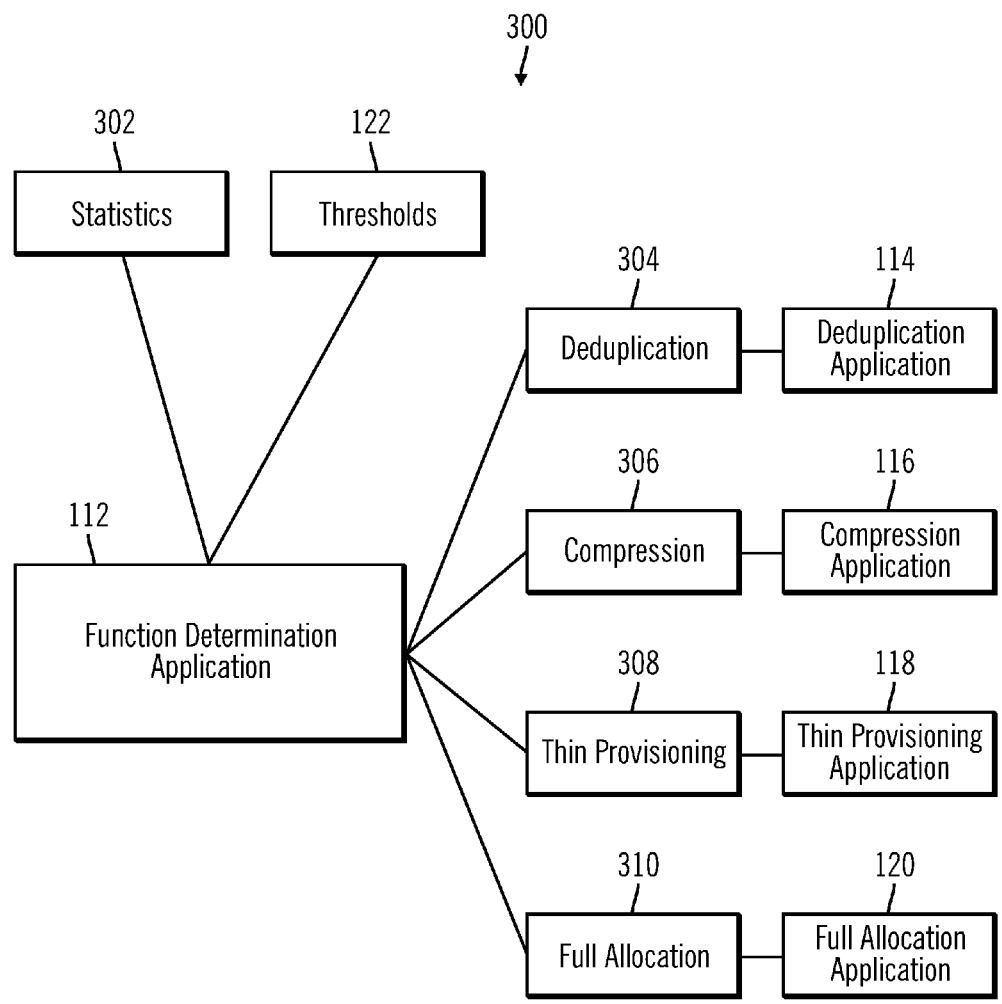
FIG. 3 illustrates a block diagram that shows how a function determination application implemented in the storage controller determines which function to apply on data stored in units of storage volumes corresponding to the plurality of storage devices, in accordance with certain embodiments.

FIG. 3 illustrates a block diagram 300 that shows how the function determination application 112 implemented in the storage controller 102 determines which function to apply on data stored in units of storage volumes 106a . . . 106m corresponding to the plurality of storage devices 104a . . . 104n, in accordance with certain embodiments.

The function determination application 112 analyzes the statistics 302 collected by the statistics collector application 110 and uses the predetermined thresholds 122 to determine whether to deduplicate 304, compress 306, thinly provision 308, or fully allocate 310 units or storage volumes. If deduplication 304 is desired then the deduplication application 114 is applied to data stored in units of the storage volumes 106a . . . 106m. If compression 306 is desired than the compression application 116 is applied to data stored in units of the storage volumes 106a . . . 106m. If thin provisioning 308 is desired then the thin provisioning application 118 is applied to data stored in units of the storage volumes 106a . . . 106m. If full allocation 310 is desired then the full allocation application 120 is applied to data stored in units of the storage volumes 106a . . . 106m.

Figure 4:
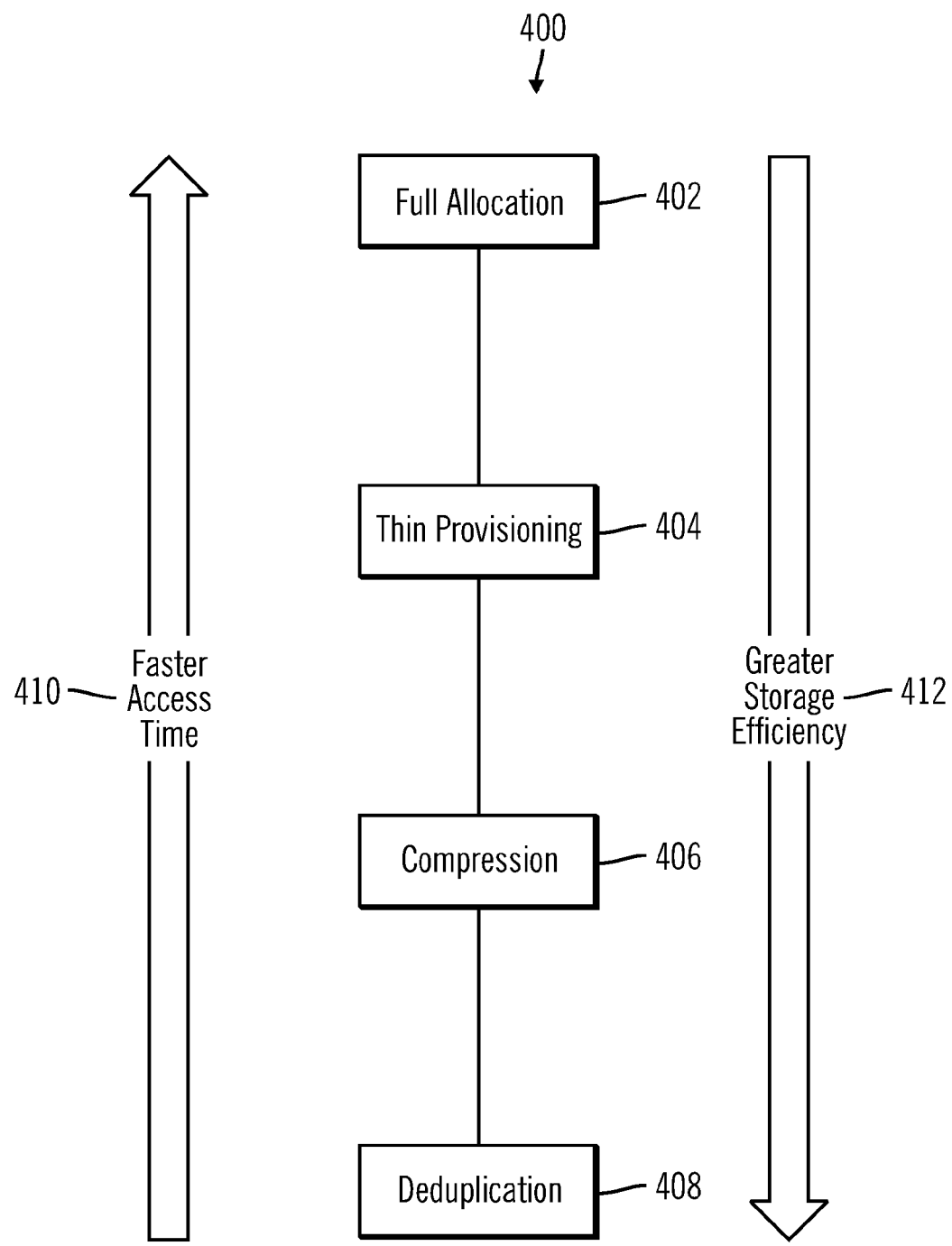
FIG. 4 illustrates a block diagram that shows how a set of functions may be placed in a relationship with respect to reduction in storage space and reduction in access time, in accordance with certain embodiments.

FIG. 4 illustrates a block diagram 400 that shows how a set of functions may be placed in a relationship with respect to reduction in storage space and reduction in access time, in accordance with certain embodiments.

In certain embodiments, a determination may be performed for a volume or for a unit of a volume on the compressibility, deduplicability, thin provisioning capability of the volume or the unit. With this data, an analysis can be made that is then cross-referenced with known limitations of each function.

In an exemplary embodiment, the function determination application 112 may use the data growth statistics to determine that the source volume is only 20% utilized and growing at only 1% per month, In such a situation, it may be appropriate to free up the 80% unallocated space for use by other volumes and the thin provisioning application 118 may be applied because not too many write operations that grow the volume are taking place.

The net result is that over time, the system may automatically migrate the volumes to use the correct feature for the correct volume, without any intervention from the end user. Certain embodiments decouple the end user from the complexity of the storage system and its available features. It is also possible to change the application of functions based on change in access statistics.

Deduplication may have limited throughput capability because many small block reads may be needed to rebuild a data block from the deduplicated data. On writes, deduplication may have to build hash data, and look up any duplicates and this may result in additional processor usage As a result, deduplication may have a certain MB/s, I/O operations/s and response time characteristics.

Compression is mainly limited both on reads and writes by the compression algorithm and may be somewhat faster in terms of access time than deduplication.

Thin Provisioning has most of its impact on writes, and in particular writes to new areas of disk, and so may provide faster access times than either compression or deduplication.

This gives a continuum of features as shown in FIG. 4 from fully allocated 402 to thinly provisioned 404 to compressed 406 to deduplicated 408, from highest performing to lowest performing as shown via reference numeral 410 in FIG. 4. However, the greatest storage efficiency (shown via reference numeral 412) in obtained in situations where the performance is the lowest.

This background information on the limitations of each feature can be used to determine if the volume being analyzed may be "down featured". Based on the current access characteristics indicated via throughput, if the access characteristics can be contained, the system may run a sample "down feature" process for a small subset of the volume data. For example, if compression is chosen, then a scratch volume may be temporarily created, and the compression application 116 may run on the subset of volume data to determine if the overheads of compression are worth in terms of disk usage savings. The same applies for deduplication. Based on such sample runs a decision may be made as to whether to achieve greater storage efficiency at the cost of greater access time.

It should be noted that, in certain embodiments the plurality of exemplary functions, such as full allocation 402, thin provisioning 404, compression 406, and deduplication may be performed in a different order than the order shown in FIG. 4. Also, in certain embodiments a plurality of exemplary functions may be active on the same extent, block, etc. For example, in certain embodiments, both deduplication and compression functions may be active on the same extent. The functions 402, 404, 406, 408 shown in FIG. 4 are for purposes of illustration, and in other embodiments additional functions that are not shown in FIG. 4 may be applied.

Figure 5:
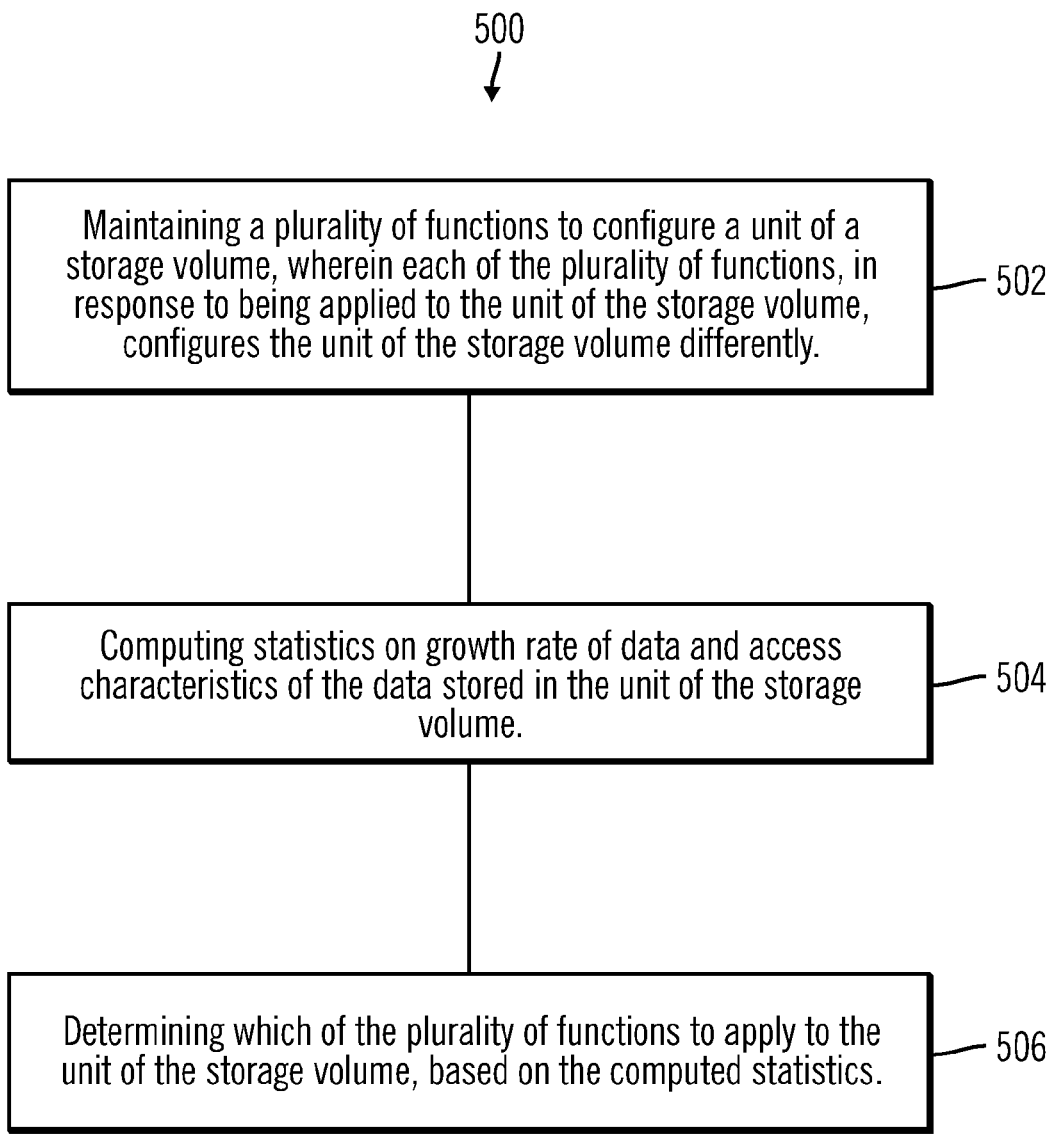
FIG. 5 illustrates a flowchart that shows operations performed by the storage controller, in accordance with certain embodiments.

FIG. 5 illustrates a flowchart 500 that shows operations performed by the storage controller 102, in accordance with certain embodiments. The operations shown in FIG. 5 may be performed by applications executing within the storage controller 102.

Control starts at block 502 in which a plurality of functions to configure a unit of a storage volume is maintained, wherein each of the plurality of functions, in response to being applied to the unit of the storage volume, configures the unit of the storage volume differently.

Control proceeds to block 504 in which statistics are computed on growth rate of data and access characteristics of the data stored in the unit of the storage volume. A determination is made (at block 506) as to which of the plurality of functions to apply to the unit of the storage volume, based on the computed statistics.

In additional embodiments, the plurality of functions includes full allocation 120, thin provisioning 118, data compression 116, and data deduplication 114 in decreasing order of performance 410 in terms of performing operations on the unit of the storage volume, and in an increasing order of efficiency 412 in terms of storage requirements in the unit of the storage volume. Volumes may be upgraded or downgraded in terms of access times and storage efficiency by applying different functions to the data stored in the volumes.

Certain embodiments may examine "chunks", i.e., units, of each volume and determine based on performance, if that chunk should be moved up or down a tier. For example, a very high performing chunk may be stored on a solid state disk (SSD), a low performing chunk on serially coupled devices, etc. In certain embodiments, it may be determined that a chunk X is very infrequently accessed and so that chunk X may be compressed, while chunk Y is very frequently accessed, and chunk Y may remain as a fully allocated chunk. This may mean that a volume may be using all, some, or none of the advanced features for reduction of storage, but the embodiments take the granularity from a volume level to a chunk level.

Therefore FIGS. 1-5 illustrate certain embodiments in which a determination is made based on usage statistics of access time and storage requirements which of a plurality of functions to reduce data storage requirements is to be applied to data stored in storage volumes.

Cloud Computing Embodiments

The computing environment 100 of FIG. 1 may be part of a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. The cloud computing implementation is described with respect to FIGS. 6-8. This cloud model may include at least five characteristics, at least three service models, and at least four deployment models.

The at least five characteristics of the cloud model are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick source platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The at least three service models are as follows:

Software as a Service (SaaS): the capability provided to the consumer is to use the provider's applications running on a cloud infrastructure. The applications are accessible from various source devices through a thin source interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The at least four deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
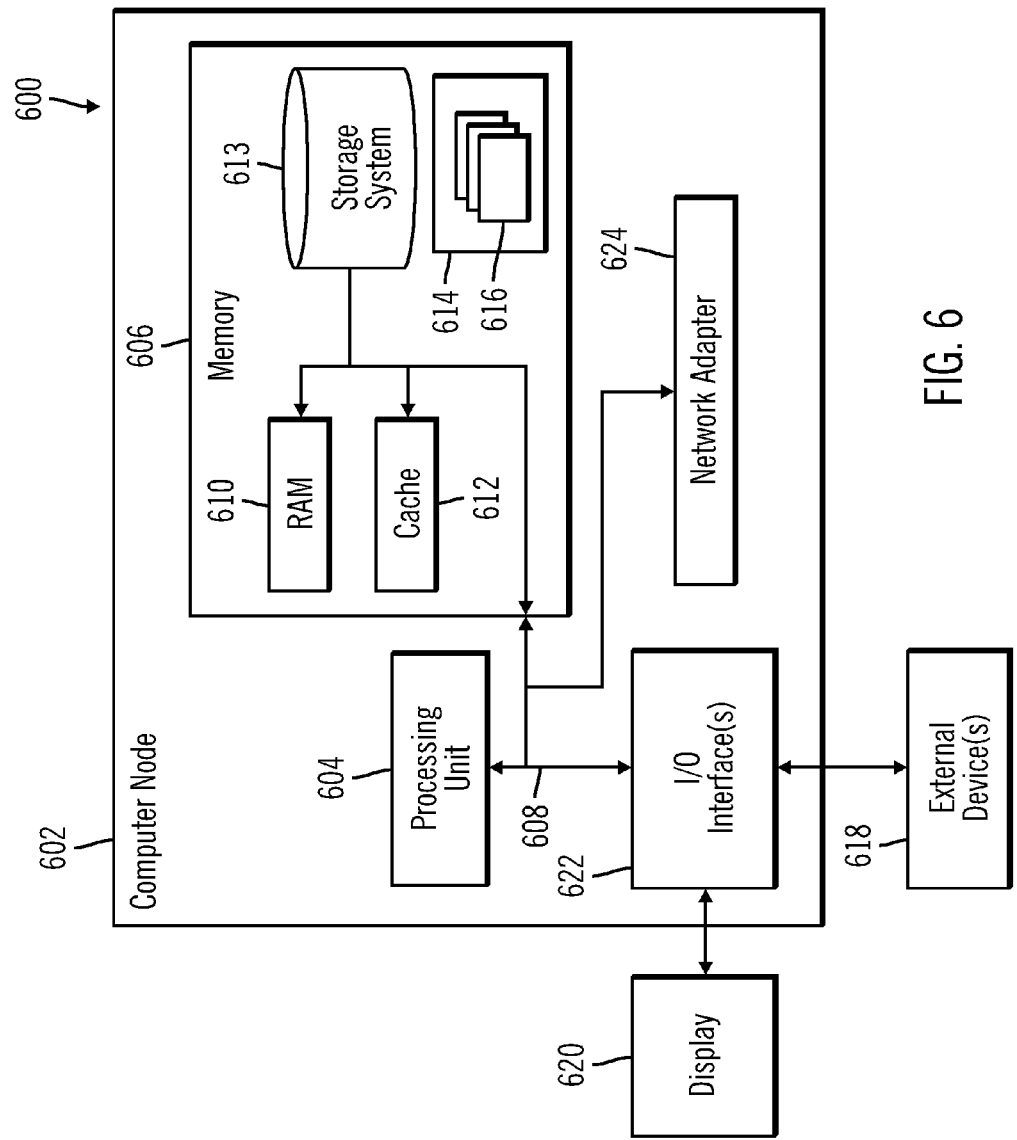
FIG. 6 illustrates an implementation of a node in a network computing embodiment.

FIG. 6 illustrates an embodiment of a cloud computing node 600 which may comprise an implementation of the storage controller 102 and storage device 104a . . . 104n components, where the components may be implemented in one or more of the nodes 600. Cloud computing node 600 is only one example of a suitable cloud computing node and is not intended to suggest any limitation as to the scope of use or functionality of embodiments of the invention described herein. Regardless, cloud computing node 600 is capable of being implemented and/or performing any of the functionality set forth hereinabove.

In cloud computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus 608 that couples various system components including system memory 606 to processor 604.

Bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media.

System memory 606 can include computer system readable media in the form of volatile memory, such as random access memory (RAM) 610 and/or cache memory 612. Computer system/server 602 may further include other removable/non-removable, volatile/non-volatile computer system storage media. By way of example only, storage system 613 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 608 by one or more data media interfaces. As will be further depicted and described below, memory 606 may include at least one program product having a set (e.g., at least one) of program modules that are configured to carry out the functions of embodiments of the invention.

Program/utility 614, having a set (at least one) of program modules 616, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 616 generally carry out the functions and/or methodologies of embodiments of the invention as described herein.

Computer system/server 602 may also communicate with one or more external devices 618 such as a keyboard, a pointing device, a display 620, etc.; one or more devices that enable a user to interact with computer system/server 602; and/or any devices (e.g., network card, modem, etc.) that enable computer system/server 602 to communicate with one or more other computing devices. Such communication can occur via Input/Output (I/O) interfaces 622. Still yet, computer system/server 602 can communicate with one or more networks such as a local area network (LAN), a general wide area network (WAN), and/or a public network (e.g., the Internet) via network adapter 624. As depicted, network adapter 624 communicates with the other components of computer system/server 602 via bus 608. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Figure 7:
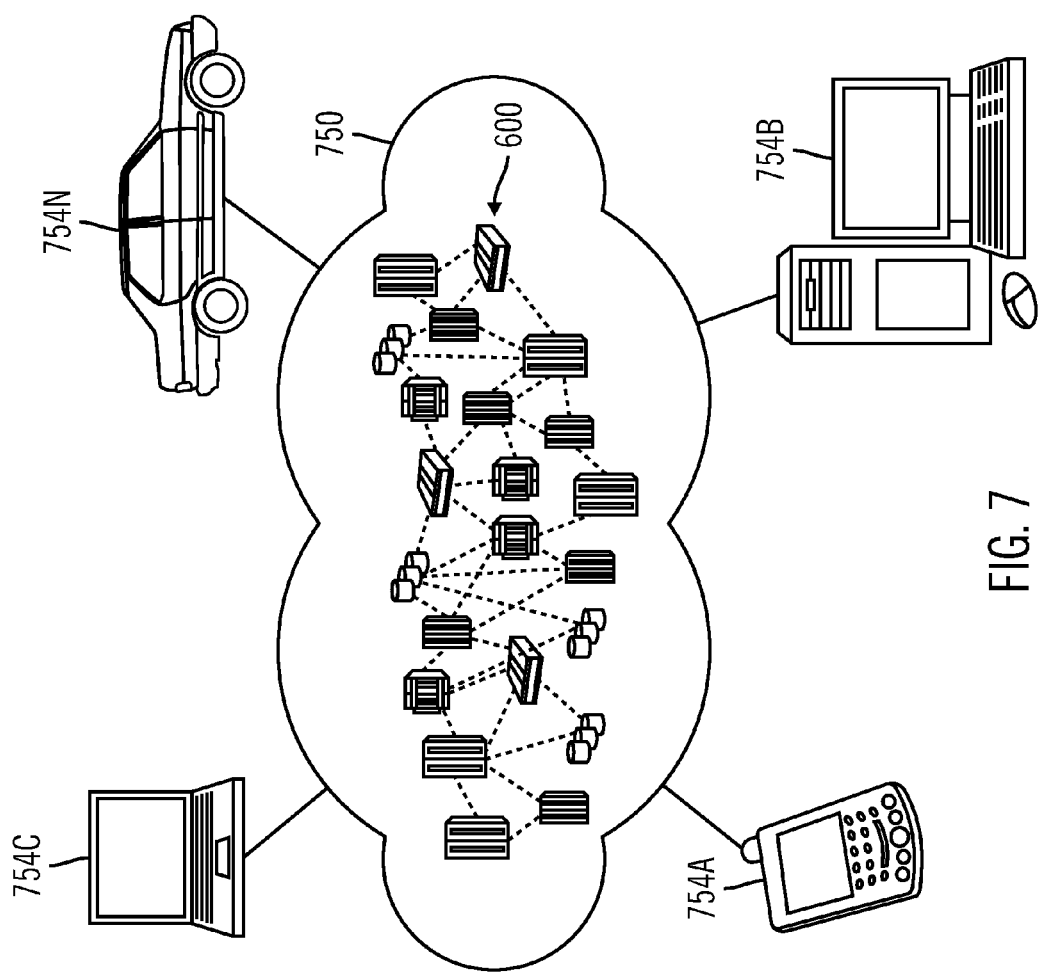
FIG. 7 illustrates an embodiment of a cloud computing environment.

Referring now to FIG. 7, illustrative cloud computing environment 750 is depicted. As shown, cloud computing environment 750 comprises one or more cloud computing nodes 600 with which local computing devices used by cloud consumers, such as, for example, personal digital assistant (PDA) or cellular telephone 754A, desktop computer 754B, laptop computer 754C, and/or automobile computer system 754N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 600 and cloud computing environment 750 can communicate with any type of computerized device over any type of network and/or network addressable connection (e.g., using a web browser).

Further, FIG. 7 shows a single cloud. However, certain cloud embodiments may provide a deployment model including a separate "Backup" or "Data Protection" cloud, in addition to the cloud having the customer/production data. Providing a separate and distinct additional cloud as the data protection cloud in order to separate whatever primary cloud model (provide, community, hybrid, etc) from the data protection cloud prevents a single point of failure and provides a greater degree of protection of the customer data in the separate backup cloud.

Figure 8:
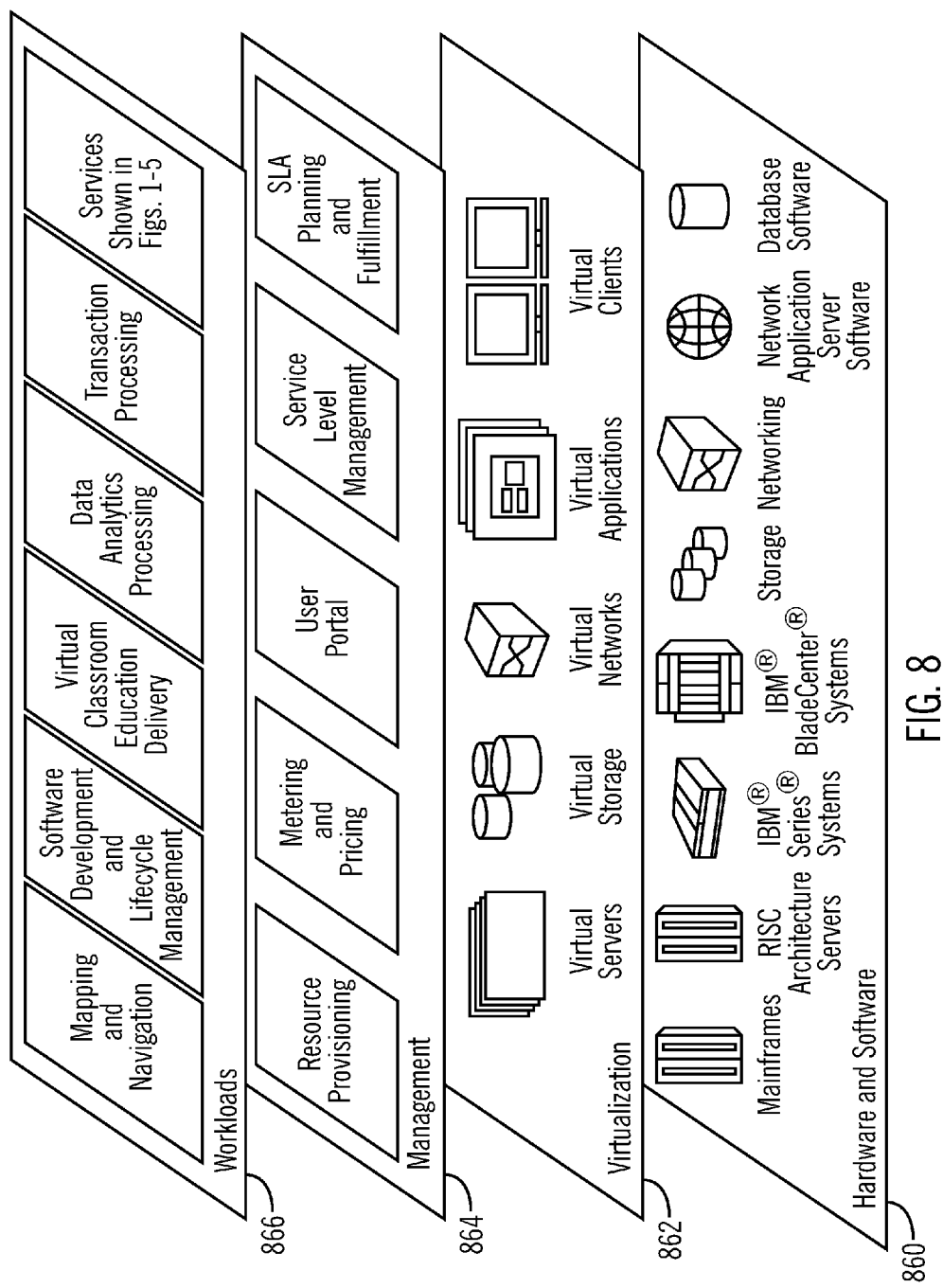
FIG. 8 illustrates an embodiment of abstraction model layers of a cloud computing environment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 862 provides an abstraction layer from which the following examples of virtual entities may be provided: virtual servers; virtual storage; virtual networks, including virtual private networks; virtual applications and operating systems; and virtual sources.

In one example, management layer 864 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 866 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the statistics collection, function determination, deduplication, compression, thin provisioning, and full allocation services, such as those described with respect to FIGS. 1-5, above.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

* Java is a trademark or registered trademark of Oracle and/or its affiliates.
* IBM, zSeries, pSeries, xSeries; BladeCenter, WebSphere, DB2 are trademarks or registered trademarks of IBM corporation.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
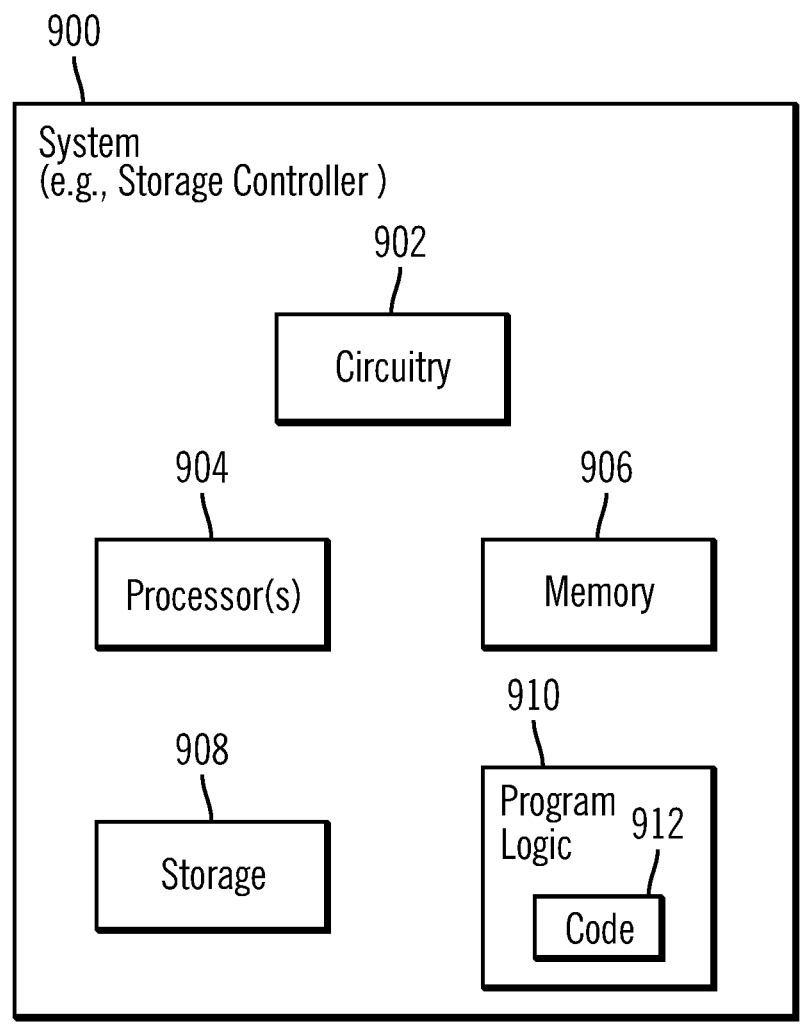
FIG. 9 illustrates a block diagram of a computational system that shows certain elements that may be included in the storage controller of FIG. 1, in accordance with certain embodiments.

FIG. 9 illustrates a block diagram that shows certain elements that may be included in the storage controller 102, in accordance with certain embodiments. The system 900 may comprise the storage controller 102 and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for automated selection of functions to reduce storage capacity of a computer storage device, comprising:

maintaining a plurality of functions to configure a unit of a storage volume, wherein each of the plurality of functions, in response to being applied to the unit of the storage volume, configures the unit of the storage volume differently, wherein the plurality of functions includes full allocation, thin provisioning, data compression, and data deduplication;

computing statistics on growth rate of data and access characteristics of the data stored in the unit of the storage volume;

determining which of the plurality of functions to apply to the unit of the storage volume, based on the computed statistics wherein the plurality of functions includes full allocation, thin provisioning, data compression, and data deduplication in a decreasing order of performance in terms of performing operations on the unit of the storage volume, and in an increasing order of efficiency in terms of storage requirements in the unit of the storage volume, wherein: a new unit is initially provisioned as fully allocated and does not use thin provisioning, data compression or data deduplication; and based on the computed statistics, migrating the new unit to use thin provisioning, data compression, or data deduplication, wherein the computed statistics include determining a rate at which write operations are performed on the unit of the storage volume, and an available amount of unused space on the unit of the storage volume;

compressing the data stored on the unit of the storage volume, in response to determining that an access time requirement for the data will be met subsequent to the compressing of the data stored in the unit of the storage volume, wherein the computed statistics include determining how much the data stored on the unit of the storage volume can be compressed;

applying data deduplication to the unit of the storage volume, in response to determining that duplicative data present on the unit of the storage volume exceeds a predetermined threshold and that the access time requirement for the unit of the storage volume is greater than a predetermined access time rate, wherein the computed statistics include determining how much duplicative data is present on the unit of the storage volume; and wherein the compressing and the data deduplication reduce storage space requirements of the storage volume.

2. The method of claim 1, wherein the plurality of functions includes full allocation, the method further comprising applying full allocation to the unit of the storage volume, in response to determining that access time requirement for the unit of the storage volume is less than a predetermined threshold amount of time.

3. The method of claim 1, wherein:

a first unit that is a most frequently accessed unit of the storage volume is maintained as a fully allocated unit;

a second unit that is a less frequently accessed unit of the storage volume compared to the first unit is maintained as a thin provisioned unit;

a third unit that is a still less frequently accessed unit of the storage volume compared to the second unit is maintained as a compressed unit; and a fourth unit that is a least frequently accessed unit of the storage volume is maintained as a deduplicated unit.

4. The method of claim 1 further comprising if compression throughput rates are able to satisfy access patterns on the new unit, migrating the new unit that is initially provisioned as fully allocated to a compressed unit.

5. A system for automated selection of functions to reduce storage capacity of a computer storage device, comprising:

a memory; and a processor coupled to the memory, wherein the processor performs operations, the operations comprising maintaining a plurality of functions to configure a unit of a storage volume, wherein each of the plurality of functions, in response to being applied to the unit of the storage volume, configures the unit of the storage volume differently, wherein the plurality of functions includes full allocation, thin provisioning, data compression, and data deduplication, computing statistics on growth rate of data and access characteristics of the data stored in the unit of the storage volume, determining which of the plurality of functions to apply to the unit of the storage volume, based on the computed statistics wherein the plurality of functions includes full allocation, thin provisioning, data compression, and data deduplication in a decreasing order of performance in terms of performing operations on the unit of the storage volume, and in an increasing order of efficiency in terms of storage requirements in the unit of the storage volume, wherein: a new unit is initially provisioned as fully allocated and does not use thin provisioning, data compression or data deduplication; and based on the computed statistics, migrating the new unit to use thin provisioning, data compression, or data deduplication, wherein the computed statistics include determining a rate at which write operations are performed on the unit of the storage volume, and an available amount of unused space on the unit of the storage volume, compressing the data stored on the unit of the storage volume, in response to determining that an access time requirement for the data will be met subsequent to the compressing of the data stored in the unit of the storage volume, wherein the computed statistics include determining how much the data stored on the unit of the storage volume can be compressed, applying data deduplication to the unit of the storage volume, in response to determining that duplicative data present on the unit of the storage volume exceeds a predetermined threshold and that the access time requirement for the unit of the storage volume is greater than a predetermined access time rate, wherein the computed statistics include determining how much duplicative data is present on the unit of the storage volume, and wherein the compressing and the data deduplication reduce storage space requirements of the storage volume.

6. The system of claim 5, wherein the plurality of functions includes full allocation, the operations further comprising applying full allocation to the unit of the storage volume, in response to determining that access time requirement for the unit of the storage volume is less than a predetermined threshold amount of time.

7. The system of claim 5, wherein:

a first unit that is a most frequently accessed unit of the storage volume is maintained as a fully allocated unit;

a second unit that is a less frequently accessed unit of the storage volume compared to the first unit is maintained as a thin provisioned unit;

a third unit that is a still less frequently accessed unit of the storage volume compared to the second unit is maintained as a compressed unit; and a fourth unit that is a least frequently accessed unit of the storage volume is maintained as a deduplicated unit.

8. The system of claim 5 further comprising if compression throughput rates are able to satisfy access patterns on the new unit, migrating the new unit that is initially provisioned as fully allocated to a compressed unit.

9. A computer program product stored on a non-transitory computer readable storage medium having computer readable program code embodied therewith, the computer readable program code configured to perform operations when executed via a processor, for automated selection of functions to reduce storage capacity of a computer storage device, the operations comprising:

maintaining a plurality of functions to configure a unit of a storage volume, wherein each of the plurality of functions, in response to being applied to the unit of the storage volume, configures the unit of the storage volume differently, wherein the plurality of functions includes full allocation, thin provisioning, data compression, and data deduplication;

computing statistics on growth rate of data and access characteristics of the data stored in the unit of the storage volume;

determining which of the plurality of functions to apply to the unit of the storage volume, based on the computed statistics wherein the plurality of functions includes full allocation, thin provisioning, data compression, and data deduplication in a decreasing order of performance in terms of performing operations on the unit of the storage volume, and in an increasing order of efficiency in terms of storage requirements in the unit of the storage volume, wherein: a new unit is initially provisioned as fully allocated and does not use thin provisioning, data compression or data deduplication; and based on the computed statistics, migrating the new unit to use thin provisioning, data compression, or data deduplication, wherein the computed statistics include determining a rate at which write operations are performed on the unit of the storage volume, and an available amount of unused space on the unit of the storage volume;

compressing the data stored on the unit of the storage volume, in response to determining that an access time requirement for the data will be met subsequent to the compressing of the data stored in the unit of the storage volume, wherein the computed statistics include determining how much the data stored on the unit of the storage volume can be compressed;

applying data deduplication to the unit of the storage volume, in response to determining that duplicative data present on the unit of the storage volume exceeds a predetermined threshold and that the access time requirement for the unit of the storage volume is greater than a predetermined access time rate, wherein the computed statistics include determining how much duplicative data is present on the unit of the storage volume; and wherein the compressing and the data deduplication reduce storage space requirements of the storage volume.

10. The computer program product of claim 9, wherein the plurality of functions includes full allocation, the operations further comprising applying full allocation to the unit of the storage volume, in response to determining that access time requirement for the unit of the storage volume is less than a predetermined threshold amount of time.

11. The computer program product of claim 9, wherein:

a first unit that is a most frequently accessed unit of the storage volume is maintained as a fully allocated unit;

a second unit that is a less frequently accessed unit of the storage volume compared to the first unit is maintained as a thin provisioned unit;

a third unit that is a still less frequently accessed unit of the storage volume compared to the second unit is maintained as a compressed unit; and a fourth unit that is a least frequently accessed unit of the storage volume is maintained as a deduplicated unit.

12. The computer program product of claim 9 further comprising if compression throughput rates are able to satisfy access patterns on the new unit, migrating the new unit that is initially provisioned as fully allocated to a compressed unit.

* * * * *